United States Patent [19]

Couture

[11] Patent Number: 5,713,166
[45] Date of Patent: Feb. 3, 1998

[54] MONOCOQUE STAIRCASE AND METHOD FOR JOINING WOODEN PIECES

[75] Inventor: Raymond Couture, Bromont, Canada

[73] Assignee: Structures Monocoques Inc., Montreal, Canada

[21] Appl. No.: 247,250

[22] Filed: May 23, 1994

[51] Int. Cl.[6] .......................... E04F 11/09; B29C 65/00
[52] U.S. Cl. .................... 52/191; 52/182; 52/437; 156/304.5; 264/263
[58] Field of Search .................... 52/182, 188, 189, 52/190, 191, 592.4, 233, 437, 439; 156/87, 304.5; 264/261, 263

[56] References Cited

U.S. PATENT DOCUMENTS

| | | | |
|---|---|---|---|
| 103,105 | 5/1870 | Van Camp et al. | 52/437 |
| 1,081,074 | 12/1913 | Winslow | 52/190 |
| 1,265,949 | 5/1918 | Osborn | 52/189 |
| 1,497,058 | 6/1924 | Barriball | 52/190 |
| 1,622,103 | 3/1927 | Fulton | 52/592.4 |
| 1,669,652 | 5/1928 | Brown | 52/437 |
| 1,893,876 | 1/1933 | Anderson | 52/191 |
| 1,931,650 | 10/1933 | Elmendorf | 52/437 |
| 2,146,782 | 2/1939 | Westberg | 52/437 |
| 2,374,905 | 5/1945 | Wale | 52/189 |
| 2,392,734 | 1/1946 | Haberstump | 264/263 |
| 2,520,452 | 8/1950 | Brune, Sr. | 52/190 |
| 2,672,045 | 3/1954 | Alcini | 52/190 |
| 3,007,283 | 11/1961 | Holland | 52/190 |
| 3,014,611 | 12/1961 | Marshall | 264/261 |
| 3,909,997 | 10/1975 | Eickhof | 52/191 |
| 4,888,934 | 12/1989 | Couture | |

FOREIGN PATENT DOCUMENTS 1013760  12/1965  United Kingdom ............ 156/304.5

*Primary Examiner*—Michael Safavi
*Attorney, Agent, or Firm*—Swabey Ogilvy Renault

[57] ABSTRACT

A staircase of monocoque construction comprises a pair of stringers, a series of successive and alternating treads and risers and nosings which are all made of solid wood or of composite wood such as O.S.B., pyrock, plywood, particle board, etc. At locations where these various components are to be joined, the components define facing grooves with a tapered space being also defined between the components. A gap filling substance, such as a polyester resin reinforced with micro-glass fibers, injected in the large ends of the tapered spaces fills the grooves as well as the tapered spaces and adhesively joins when it hardens the treads and risers one to another in succession, and also adhesively joins the stringers and the nosings to the treads and risers. The hardened resin "welds" the wooden components one to another thereby acting as a welded mechanical key, whereby the assembled structure forms a monocoque staircase. A method is also suggested to produce a monocoque staircase. Also, the invention concerns a method for joining as a weld a pair of wooden components in a monocoque assembly by defining facing grooves in the components and by providing a wedged space therebetween; then, a gap filling and adhesive resin is disposed in the grooves and in the spaces which, as it sets, resembles a welded key so as to join the components together in a monocoque assembly.

17 Claims, 2 Drawing Sheets

1

MONOCOQUE STAIRCASE AND METHOD FOR JOINING WOODEN PIECES

BACKGROUND OF THE INVENTION

1. Field of the Invention

The present invention relates to staircases and, more particularly, to a monocoque staircase, to a monocoque step assembly for a staircase and to a method for generally joining wooden pieces.

2. Description of the Prior Art

In the constructions of staircases, it is well known that the various components thereof, namely the stringers and the steps extending therebetween including the treads and the risers, are now all presently assembled on site using nails in most cases. Indeed, with the two stringers running parallel one with respect to the other, the treads and the risers are positioned therebetween and nailed thereto as well as being nailed to one another in order to produce a flight of stairs, i.e. the staircase.

Generally, in the case of wood pieces, it is well known to join various wooden members one to the other using nails or screws. Also, wooden pieces can be attached together by way of various glues, wherein a film of glue is used between the surfaces of both pieces which are to be bonded one to another. It is well known that a disadvantage of using glue to assemble wooden elements lies in that the wooden element must be in constant compression as long as the curing of the glue as not been accomplished.

SUMMARY OF THE INVENTION

It is therefore an aim of the present invention to provide an improved staircase which is substantially of monocoque construction.

It is also an aim of the present invention to provide a staircase which can be made in plant, the staircase being of substantially monocoque construction.

It is a further aim of the present invention to provide a new method for joining wooden members.

It is a still further aim of the present invention to provide a staircase of improved strength and of reduced cost which can be manufactured in plant and which can then be quickly and simply installed on site, such as in a house, or the like.

Therefore in accordance with the present invention, there is provided a staircase of substantially monocoque construction comprising at least one stringer means and a series of successive and alternating tread means and riser means, each of said tread means, riser means and stringer means being made of solid or composite wood, space means defined at various connection areas between at least two of said tread, riser and stringer means being substantially filled with filler means, said filler means adhesively joining said tread and riser means one to another in succession and further adhesively joining said stringer means to said tread and riser means, wherein said filler means during assembly of said staircase is disposed in said space means with said filler means being adapted to adhere thereafter to said tread means, said riser means and said stringer means to form said substantially monocoque staircase.

Also in accordance with the present invention, there is provided a saw-toothed assembly of successive treads and risers for use in staircases, said assembly being of substantially monocoque construction and comprising a series of successive and alternating tread means and riser means, each of said tread means and riser means being made of solid or composite wood, space means defined at various connection areas between said tread means and said riser means being substantially filled with filler means, said filler means adhesively joining said tread and riser means one to another in succession, wherein said filler means during assembly of said tread and riser means is disposed in said space means with said filler means being adapted to adhere thereafter to said tread means and to said riser means to form said substantially monocoque assembly.

Further in accordance with the present invention, there is provided a method for making a saw-toothed assembly of substantially monocoque construction for use in staircases, comprising the steps of:
a) providing a series of tread means and riser means each made of a solid or composite wood;
b) disposing in a saw-toothed position said tread and riser means in succession and in an alternating manner, said tread and riser means in said saw-toothed position having substantially a shape of the desired saw-toothed assembly and defining therebetween space means;
c) introducing filler means in said space means, said filler means substantially filling said space means and comprising adhesive means;
d) allowing said filler means containing said adhesive means to adhesively join said tread and riser means one to another for forming said substantially monocoque assembly.

Still further in accordance with the present invention, there is provided a method for joining in a substantially monocoque assembly at least two pieces made of solid or composite wood, comprising the steps of:
a) providing said two pieces;
b) disposing said two pieces substantially in a desired monocoque assembly position thereof wherein said two pieces define therebetween space means;
c) introducing filler means in said space means, said filler means comprising adhesive means;
d) allowing said filler means containing said adhesive means to adhesively join said two pieces one to another for forming said substantially monocoque assembly.

BRIEF DESCRIPTION OF THE DRAWINGS

Having thus generally described the nature of the invention, reference will now be made to the accompanying drawings, showing by way of illustration a preferred embodiment thereof, and in which.

DESCRIPTION OF THE PREFERRED EMBODIMENTS

Figure 1:
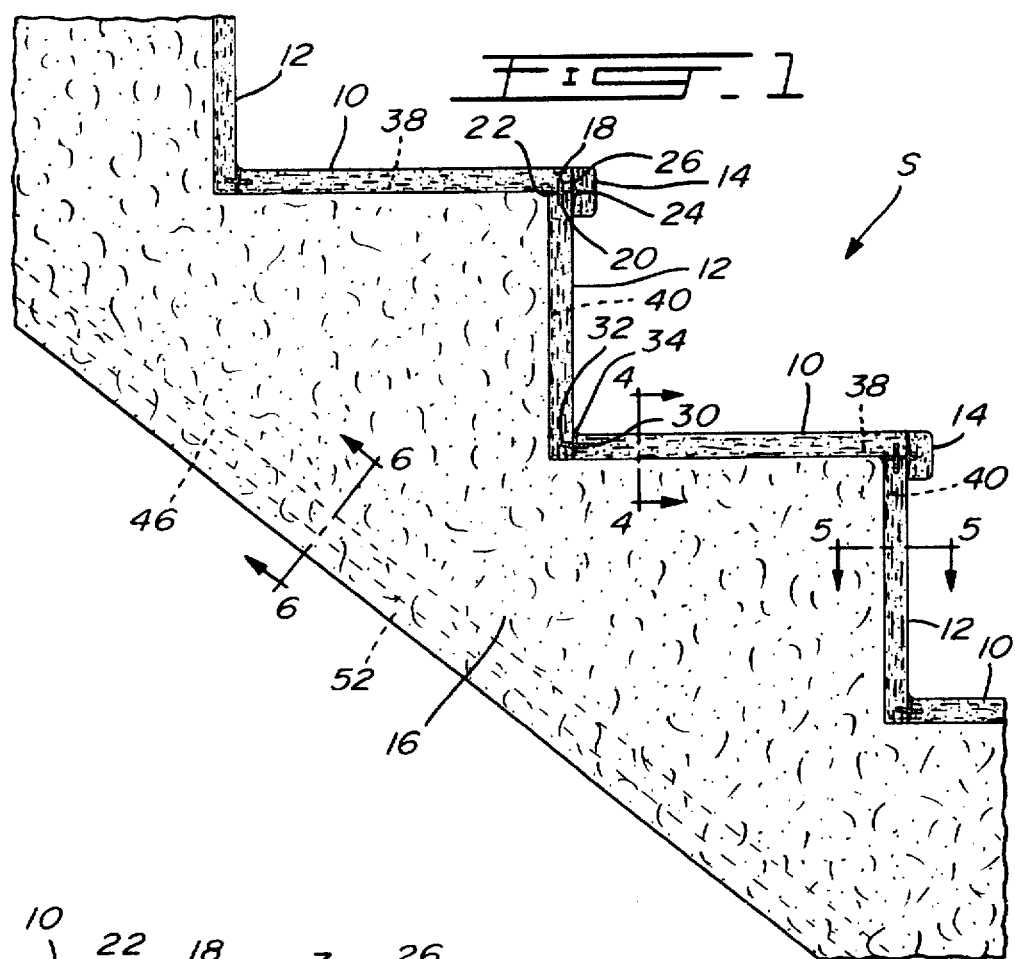
FIG. 1 is a side elevational view of part of a monocoque staircase in accordance with the present invention.

FIG. 1 is a side elevational view of part of a monocoque staircase S manufactured in accordance with the present invention. Generally, as opposed to prior art staircases which are assembled on site with the use of nails, the present staircase S can be manufactured in plant and the various components thereof are "welded" together instead of being nailed to each other.

The staircase S, generally for indoor use, comprises a plurality of steps each including a horizontal generally rectangular tread 10, a vertically and generally rectangular riser 12 which extends downwardly from a front end of the riser 10 and which is connected thereto, and a nosing 14 which is assembled to the front end of the tread 10 and to an upper end of the riser 12. At each lateral end of the set of steps of the staircase S, there is provided a vertically extending stringer 16, whereby in a conventional manner there are two horizontally spaced apart and parallel stringers 16 onto which the treads 10 and the risers 12 of the steps of the present staircase S are assembled, as it will be described in more details hereinafter.

The treads 10, the risers 12, the nosings 14 and the stringers 16 are all made of solid wood or of wood-based materials which are hereinafter referred to as composite woods and which include waferboard, plywood, particle board, pyrock (which is similar to particle board as it uses particles of wood such as sawdust but which uses cement to bond the wood particles instead of a glue), and especially O.S.B. which stands for "Oriented Strand Board" and which is basically an improved waferboard in which the wood shavings are oriented in layers, somewhat like plywood, as opposed to waferboard in which the shavings are randomly disposed.

Generally, to assemble each component of the staircase S and, more particularly, the treads 10, the risers 12, the nosings 14 and the stringers 16, the staircase is first erected and maintained in place with staples, tacks, clamps, jaws, etc., or with more automatic mechanical devices, e.g. pneumatic cylinders, etc. The aforementioned components are manufactured so that, when assembled, gaps and spaces are defined in and between the components, these gaps and spaces being adapted to receive therein, generally by injection, a liquid resin such as a polyester-based resin which, once hardened "welds" the wooden components together. The polyester resin can also contain micro-glass fibers in order to increase the resistance of the resin, when it has hardened. Various compositions of resin can be used and with different additives in order to vary, for instance, the setting time of the resin and the adherence thereof in view of the required characteristics of the resin which can depend on the nature of the wood products to be "welded" thereby.

Various other resins can be used, such as a polycarbonate resin, as long as the selected resin can act as a gap filler which can harden, normally without the need for the components that are assembled to be compressed, while "welding" the components together due to a penetration or infiltration of some resin in the fibers of the solid or composite wood components so as to adhere thereto when the resin has hardened, wherein there is some homogeneity in the assembled elements thereby providing high strength and resistance to the assembly.

Figure 2:
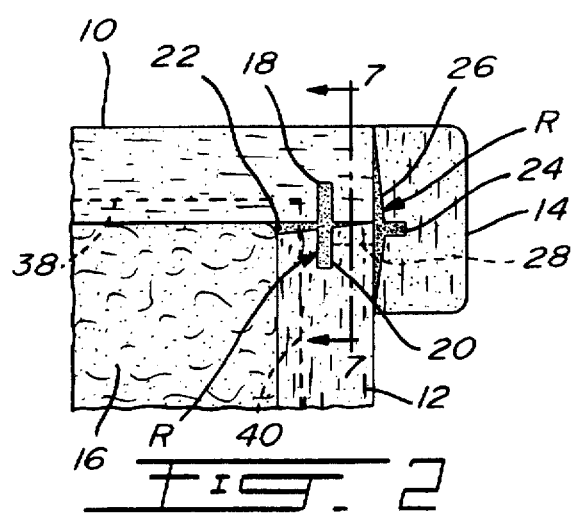
FIG. 2 is an enlarged side elevational view of part of the staircase of FIG. 1 which shows a typical connection in accordance with the present invention of a front end of a tread of a step with an upper end of a riser thereof and a connection of the tread and the riser with a nosing the step.
Figure 7:
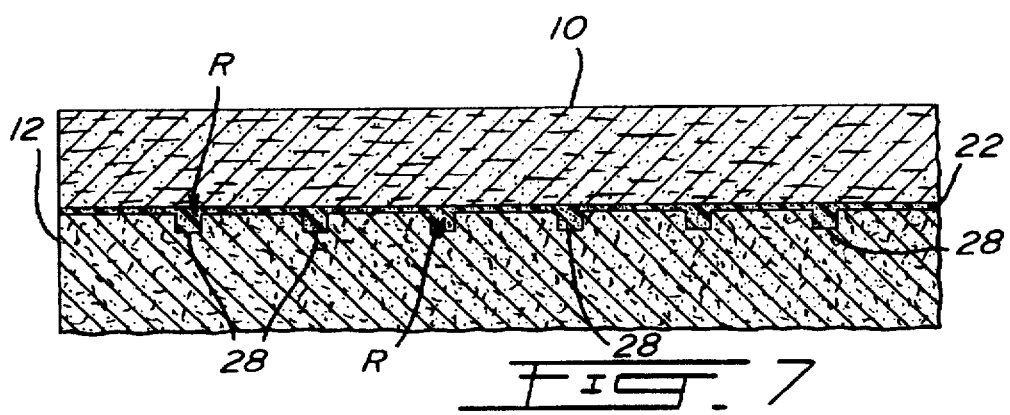
FIG. 7 is a cross-sectional view taken along lines 7—7 of FIG. 2 which illustrates in elevation a connection in accordance with the present invention of the front end of the tread of a step with the upper end of the riser thereof.

With reference to FIG. 2 which represents an enlarged view of part of FIG. 1 which shows the assembly of the tread 10, the riser 12 and the nosing 14, it is readily seen that a lower front surface of the tread 10 defines a transversally oriented substantially rectangular groove 18 which extends vertically opposite a similar groove 20 defined in an upper surface of the riser 12. Furthermore, the upper surface of the riser 12 is slightly angled with respect to the horizontal in order that a wedge 22 is defined between the tread 10 and the riser 12. The nosing 14 defines on a rear surface thereof a transversally oriented and substantially horizontal groove 24 and the rear wall of the nosing 14 defines an inwardly extending recess having the shape of a widened "V" in such a way that a triangular gap 26 is defined between the nosing 14 and the tread 10 and riser 12. Furthermore, as best seen in FIG. 7, the top end of the riser 12 defines a series of short and parallel longitudinally and horizontally extending grooves 28 which extend from a front surface of the riser 12 to the transversal groove 20 thereof. Accordingly, resin R injected at a rear larger end of the wedge 22 will fill the grooves 18 and 20 respectively of the tread 10 and of the riser 12 and, by way of the longitudinal grooves 28 of the riser 12, will also fill the groove 24 of the nosing 14 and the triangular gap 26 defined between the nosing 14 and the tread 10 and riser 12; and finally the resin R will also fill the wedge 22. Once the resin R has hardened, the tread 10, the riser 12 and the nosing 14 are solidly assembled one to another in a matter resembling that of a weld and, more particularly, a welded mechanical key.

Figure 3:
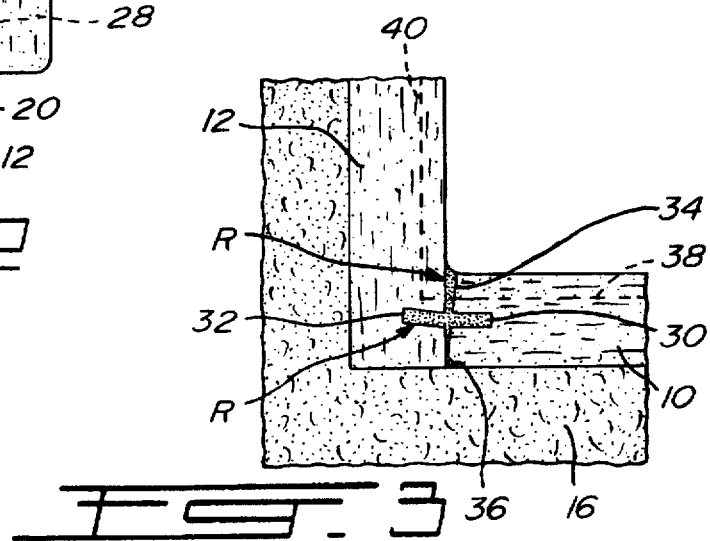
FIG. 3 is an enlarged side elevational view of part of the staircase of FIG. 1 which shows a typical connection in accordance with the present invention of a lower end of the riser of a step with a rear end of the tread thereof.

FIG. 3 is an enlarged view taken from FIG. 1 which shows a lower end of the riser 12 which is connected to a rear end of the tread 10. In a manner similar to FIG. 2, the tread 10 defines a transversally oriented, albeit in a substantially horizontal direction, and substantially rectangular groove 30 with a groove 32 being defined opposite the groove 30 in the front lower end of the riser 12. The rear end of the tread 10 is slightly angled with respect to the vertical in order to define a wedge 34 between the tread 10 and the riser 12. The groove 32 is slightly angled with respect to the horizontal in order to increase the strength and resistance of the riser 12 when assembled to the tread 10. At the bottom of the wedge 34, there is defined a short flared substantially triangular groove 36 to increase the assembled structure's resistance to vertical loads. Resin R injected in an upper larger end of the wedge 34 will fill the grooves 30, 32 and 36 as well as the wedge 34 itself. Once the resin R has hardened, the lower end of the riser 12 is securely "welded" to the rear end of the tread 10. The groove 36 also increases the surfaces of contact between the resin R and the associated surfaces of the tread 10 and riser 12.

Figure 4:
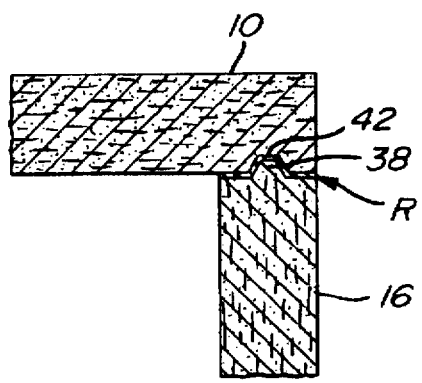
FIG. 4 is a cross-sectional view taken along lines 4—4 of FIG. 1 which illustrates a connection of the tread with a stringer of the staircase.
Figure 5:
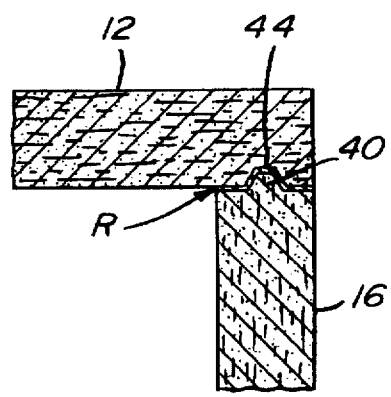
FIG. 5 is a cross-sectional view taken along lines 5—5 of FIG. 1 which illustrates a connection of the riser of a step with the stringer of the staircase.

FIGS. 4 and 5 illustrate the assembly of the treads 10 and risers 12 to the stringers 16. Each stringer 16 defines on the saw-toothed surfaces thereof which receive the treads 10 and the risers 12 longitudinally extending ribs which are all of isosceles trapezoidal cross-section and which include horizontal ribs 34 adapted to connect the stringer 16 to the treads 10 and vertical ribs 40 adapted to connect the stringer 16 to the risers 12. Opposite the ribs 38 and 40, the treads 10 and risers 12 respectively define longitudinally extending grooves 42 and 44 defining an isosceles trapezoidal cross-section in order that the horizontal and vertical ribs 38 and 40 can be inserted respectively in the grooves 43 and 44 of the treads 10 and risers 12. The connection of the treads 10 with the stringers 16 as in FIG. 4 and of the risers 12 with these stringers 16 as in FIG. 5 is provided by the resin R which extends between the assembled parts. The ribs 38 and 40 and the grooves 42 and 44 obviously render easier the assembly and, more particularly, the alignment of the wood components. Furthermore, these ribs and grooves allow for greater surfaces of contact between the resin R and the treads 10, risers 12 and stringers 16.

Accordingly, the resin R acts as a gap filler as opposed to wood glues which are applied as a relatively thin film between the wooden parts that are assembled. The hardened resin R structurally and functionally resembles a mechanical welded key. The spaces that are filled with resin R are designed to define enough contact surfaces between the resin and the composite wood components for the resin to act on in order that a sufficiently strong and resistant connection is achieved between these components by way of the settled resin.

Figure 6:
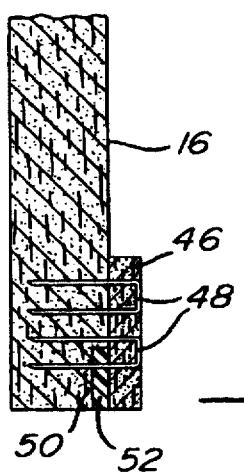
FIG. 6 is a cross-sectional view taken along lines 6—6 of FIG. 1 which illustrates a reinforced lower end of the stringer.

FIG. 6 illustrates the lower end of the stringer 16 which is reinforced as the staircase is produced substantially as a free-standing structure, whereby the stringers 16 must be able to solidly sustain the steps made up of the assembled treads 10, risers 12 and nosings 14. More particularly, the stringer reinforcement comprises a fiber glass strip 52 (which is very strong and which is also flexible enough) provided at an inner lower edge of the stringer 16 and maintained in position by an adherent and by a strip of wood 46 (of possible cross-sectional dimensions of 1.25 in. by 0.25 in) which is itself secured to the stringer 16 by way of U-shaped staples 48. A lower inside end of the stringer 16 defines a rectangular shoulder 50 with the fiber glass strip 52 being installed in the rectangular recess 50, that is between the stringer 16 and the wood strip 46. The suggested cross-section dimensions of this fiber glass strip 52 are of 0.5 in. by 0.09375 in. (i.e. ½ in. by 3/32 in.) although these dimensions can vary depending on the span of the stringer 16. Such an assembly as illustrated in FIG. 6 provides a tensile reinforcement to the stringer 16.

The stringer reinforcement is necessary in most cases in order that the plant-assembled staircase S can be handled and delivered to its installation site and installed thereat, and also in order that the staircase S can be mounted freestanding. The fiber glass strip 52 is particularly adapted to requirements of the present staircase S as it can be glued to wooden components and, in this case, to the stringers 16 and to the wood strip 46. During the curing of the glue, the staples 48 provide the required compression to the components being assembled by the glue, i.e. the stringer 16, the wood strip 46 and the fiber glass strip 52. Various glues can be used as well as an appropriate resin such as the resin R. The resulting assembly made up of the stringer 16 and the wood and fiber glass strips 46 and 52 is substantially homogeneous and thus very solid. Furthermore, the fiber glass strip 52 can be easily sawed when it is necessary to cut the staircase S which is sometimes required for instance in the case of staircases which have been manufactured and assembled in plant with a standard dimensions, such as lengths of 14 steps. The fiber glass strip 52 is thus advantageous over a steel strip as the latter is sawed with difficulty in addition to being very rigid; moreover, a steel strip cannot be glued to the wood components, whereby a homogeneous structure cannot be achieved as it is the case with the fiber glass strip 52 of the present invention, such a homogeneous structure being greatly resistant.

The wood strip 46 is used to facilitate the installation of the fiber glass strip 52 to the stringer 16 and also to increase the contact surfaces of welding or gluing of the fiber glass strip 52. Glues or adhesives which can be used to secure the fiber glass strip 52 to the stringer 16 and to the wood strip 46 include a resin such as the resin R, a PVA adhesive (i.e. polyvinyl acetate), phenolic resins containing resorcinol, etc.

As an example, the thickness of the stringer 16 can be 0.75 inch (i.e. ¾ inch), with the thickness of the treads 10 and risers 12 being either 0.625 inch or 0.75 inch (i.e. ⅝ inch or ¾ inch). The longitudinal grooves 28 defined in the upper ends of risers 12 as best seen in FIG. 7 can be transversally spaced, center to center, by one inch.

The wood used for the treads 10, the risers 12, the nosings 14 and the stringers 16 is of the waferboard-type or of the particle board-type, e.g. "O.S.B." composite panels.

Again, the resin R used in the present invention hardens without requiring compression of the elements being joined as opposed to standard wood glues for which the elements being joined must be in compression during the whole process of hardening. The resin R is a gap filler which acts as an adhesive for wood components as opposed to wood glues which are applied as a film.

The present monocoque staircase S is characterized by a high resistance to flection, to torsion and to vibrations. Furthermore, the monocoque staircase S is substantially creak proof.

The assembly of the various components of the present staircase S using the resin R which is injected in a series of gaps, grooves and wedges (and which penetrates the fibers of the wood components being assembled) can be compared to a series of keys welded to the composite wood components.

Furthermore, the present technique of injecting polyester resin or the like in various gaps, grooves and wedges defined between at least two wooden components can also be generally used to assemble wooden elements in applications other than that of the specific staircase described and illustrated herein. For instance, the present method can be used to assemble wood roof trusses without using gang nail plates, and to assemble components of architectural wooden structures with a better work and a more appealing appearance (i.e. exempt of metallic plates and other unsightly structural elements) resulting therefrom, etc.

I claim:

1. A staircase comprising at least one stringer means and a series of successive and alternating tread means and riser means, each of said tread means, riser means and stringer means being made of solid or composite wood, space means defined at various connection areas between at least two of said tread means, said riser means and said stringer means being substantially filled with filler means, said filler means adhesively joining said tread and riser means one to another in succession and further adhesively joining said stringer means to said tread and riser means, wherein said space means comprises groove means defined in each of said tread and riser means at a connection area thereof with said groove means substantially facing one another thereat, said space means also comprising a gap means provided between said tread and riser means at said connection area and in communication with said groove means, said gap means substantially defining a taper having a larger end, whereby said filler means during assembly is introduced in said space means at said larger end so as to substantially fill said groove means and said gap means thereby substantially producing a welded key between said tread and riser means at said connection area.

2. A staircase as defined in claim 1, wherein, for each tread means connected at a front end thereof to an upper end of a adjacent riser means, a first substantially vertical groove is transversely defined in a lower surface of said front end of said tread means, a second substantially vertical groove being transversely defined in a upper surface of said upper end of said riser means, said first and second grooves extending substantially opposite one another, a tapered gap being defined between said lower and upper surfaces and having a larger end thereof located rearwards of said grooves.

3. A staircase as defined in claim 2, wherein nosing means are joined to at least one of a front surface of said front end of said tread means and of a front surface of said upper end of said riser means, a nosing space means being defined between said nosing means and at least one of said front surfaces of said tread and riser means and being substantially filled with said filler means thereby being adhesively joined to at least one of said tread and riser means.

4. A staircase as defined in claim 3, wherein said nosing space means comprises a third transversal groove defined in said nosing means, a nosing gap defined between said nosing means and said front surfaces of said tread and riser means, and passage means defined in at least one of said tread and riser means for connecting said nosing gap to at least one of said first and second grooves and said tapered gap.

5. A staircase as defined in claim 4, wherein said nosing gap substantially defines a taper towards each of upper and lower rear transversal edges thereof, and wherein said passage means comprise a plurality of substantially longitudinal passages which are transversely spaced apart one from another.

6. A staircase as defined in claim 1, wherein, for each tread means connected at a rear end thereof to a lower end of a adjacent riser means, a first substantially horizontal groove is transversely defined in a rear surface of said rear end of said tread means, a second substantially horizontal groove being transversely defined in a front surface of said lower end of said riser means, said first and second grooves extending substantially opposite one another, a at least mostly tapered gap being defined between said front and rear surfaces and having a larger end thereof located above said grooves.

7. A staircase as defined in claim 6, wherein said second groove, as it extends rearwards from said front surface, gradually and slightly extends upwards, and wherein a lower end of said tapered gap defines a short flare extending downwards to lower surfaces of said tread and riser means.

8. A saw-toothed assembly of successive treads and risers for use in staircases, said assembly comprising a series of successive and alternating tread means and riser means, each of said tread mans and riser mans being made of solid or composite wood, space means defined at various connection areas between said tread means and said riser means being substantially filled with filler means, said filler means adhesively joining said tread and riser means one to another in succession, wherein said space means comprises groove means defined in each of said tread and riser means at a connection area thereof with said groove means substantially facing one another thereat, said space means also comprises a gap means provided between said tread and riser means at said connection area and in communication with said groove means, said gap means substantially defining a taper having a larger end, whereby said filler means during assembly is introduced in said space means at said larger end so as to substantially fill said groove means and said gap means thereby substantially producing a welded key between said tread and riser means at solid connection area.

9. A method for making a pre-assembled saw-toothed assembly for use in staircases, comprising the steps of:

a) providing a series of tread means and riser means each made of a solid or composite wood;

b) disposing in a saw-toothed position said tread and riser means in succession and in an alternating manner, said tread and riser means in said saw-toothed position having substantially a shape of the desired saw-toothed assembly and defining therebetween space means;

c) introducing filler means in said space means, wherein said space means comprises groove means provided in each of said tread and riser means at a connection area thereof with said groove means substantially facing one another thereat, said space means also comprising a gap means provided between said tread and riser means at said connection area and in communication with said groove means, said gap means substantially defining a taper having a larger end, whereby said filler means during assembly is introduced in said space means at said larger end so as to substantially fill said groove means and said gap means thereby substantially producing a welded key between said tread and riser means at said connection area; and d) allowing said filler means to adhesively join said tread and riser means one to another for forming said assembly.

10. A method as defined in claim 9, wherein, in step b), attachment means are provided for supporting said tread and riser means in said saw-toothed position at least until said filler means has joined said tread and riser means in step d).

11. A staircase comprising at least one stringer means and a series of successive and alternating tread means and riser means, each of said tread means, riser means and stringer means being made of solid or composite wood, space means defined at various connection areas between at least two of said tread means, said riser means and said stringer means being substantially filled with filler means, said filler means adhesively joining said tread and riser means one to another in succession and further adhesively joining said stringer means to said tread and riser means, said space means comprising groove means defined in at least one of any two components joined together amongst said tread, riser and stringer means, said space means also comprising a gap means provided between said two components and in communication with said groove means, wherein, where said stringer means is connected to either one of said tread means and said riser means, said groove means is defined in respective one of said tread means and said riser means with a corresponding rib means being defined on an end surface of said stringer means and being at least partly inserted in said groove means, whereby said filler means during assembly is introduced in said gap means so as to substantially fill said groove means and said gap means thereby substantially producing, once adhesively secured to said two components, a welded key.

12. A staircase comprising at least one stringer means and a series of successive and alternating tread means and riser means, each of said tread means, riser means and stringer means being made of solid or composite wood, space means defined at various connection areas between at least two of said tread means, said riser means and said stringer means being substantially filled with filler means, said filler means adhesively joining said tread and riser means one to another in succession and further adhesively joining said stringer means to said tread and riser means, wherein said filler means during assembly of said staircase is disposed in said space means with said filler means being adapted to adhere thereafter to said tread means, said riser means and said stringer means to form said staircase, wherein said stringer means comprises reinforcement means provided at a lower end thereof, said reinforcement means comprising an elongated fiber glass strip and adhesive means for adhesively joining said fiber glass strip to said stringer means.

13. A staircase as defined in claim 12, wherein said strip is located in a channel defined in said lower end of said stringer means and is sandwiched between and adhesively joined to said stringer means and an elongated wooden member, mounting means securing said wooden member to said stringer means.

14. A staircase as defined in claim 13, wherein said mounting means provide compression between said stringer means and said fiber glass strip at least during a curing of said adhesive means.

15. A staircase comprising at least one stringer means and a series of successive and alternating tread means and riser means, each of said tread means, riser means and stringer means being made of solid or composite wood, space means defined at various connection areas between at least two of said tread means, said riser means and said stringer means being substantially filled with filler means, said filler means adhesively joining said tread and riser means one to another in succession and further adhesively joining said stringer means to said tread and riser means, wherein said filler means during assembly of said staircase is disposed in said space means with said filler means being adapted to adhere thereafter to said tread means, said riser means and said stringer means to form said staircase, wherein said filler means comprise one of a polyester resin and a polycarbonate resin and is reinforced with micro-glass fibers.

16. A saw-toothed assembly of successive treads and risers for use in staircases, said assembly comprising a series of successive and alternating tread means and riser means, each of said tread means and riser means being made of solid or composite wood, space means defined at various connection areas between said tread means and said riser means being substantially filled with filler means, said filler means adhesively joining said tread and riser means one to another in succession, wherein said filler means during assembly of said tread and riser means is disposed in said space means with said filler means being adapted to adhere thereafter to said tread means and to said riser means to form said assembly, wherein said filler means comprise one of a polyester resin and a polycarbonate resin and is reinforced with micro-glass fibers.

17. A pre-assembled saw-toothed assembly of successive treads and risers for use in staircases, said assembly comprising a series of successive and alternating tread means and riser means, each of said tread means and riser means being made of solid or composite wood, space means defined at various connection areas between said tread means and said riser means being substantially filled with filler means, said filler means adhesively joining said tread and riser means one to another in succession in a pre-assembled structure, wherein said space means comprises groove means defined in each of said tread and riser means at a connection area thereof, tapered gap means being provided between said tread and riser means at said connection area and in communication with said groove means, whereby said filler means during assembly is introduced in said space means through said gap means so as to substantially fill said space means thereby joining said tread and riser means together at said connection areas.

* * * * *